United States Patent Office 3,524,360
Patented Aug. 18, 1970

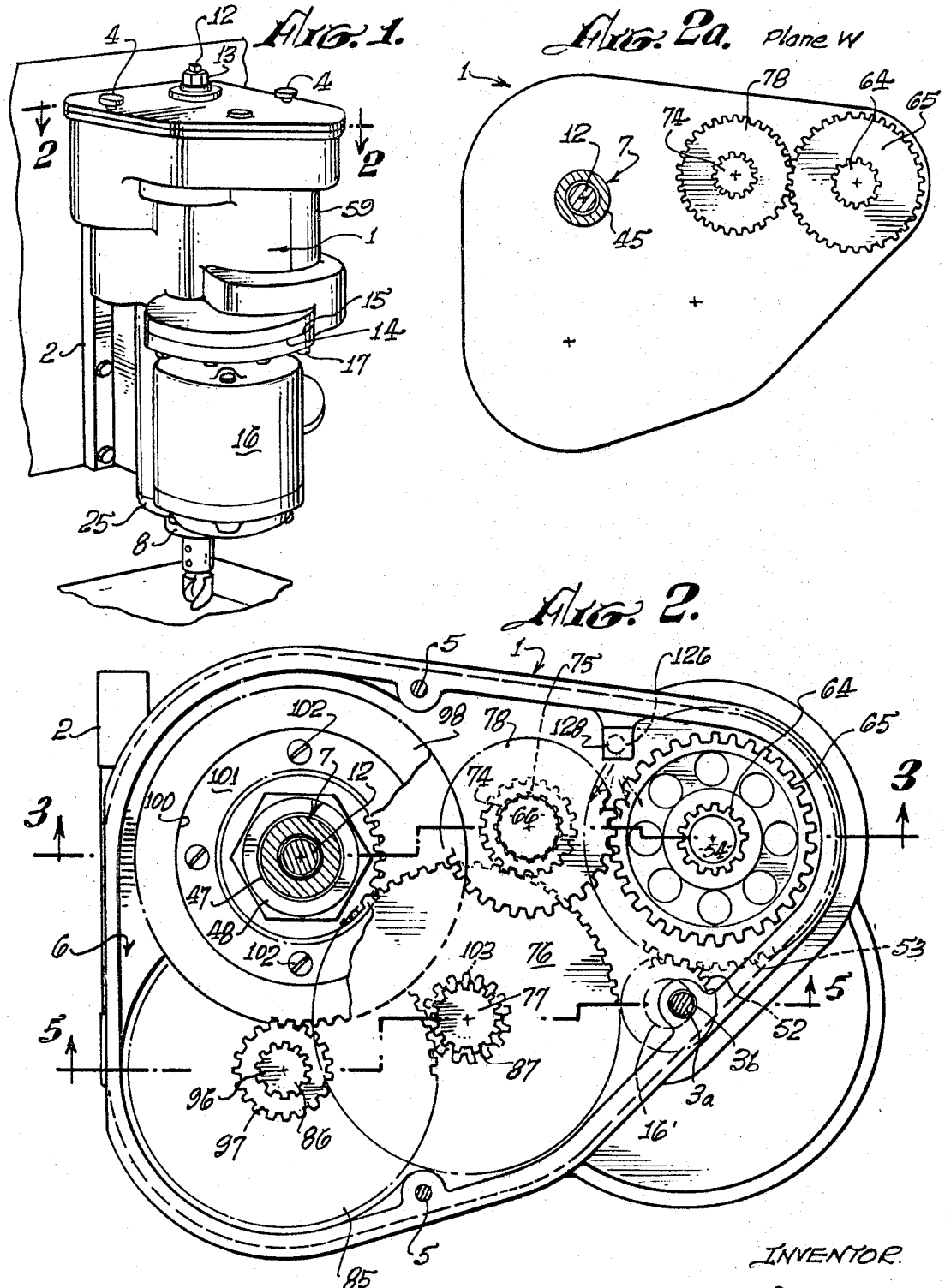

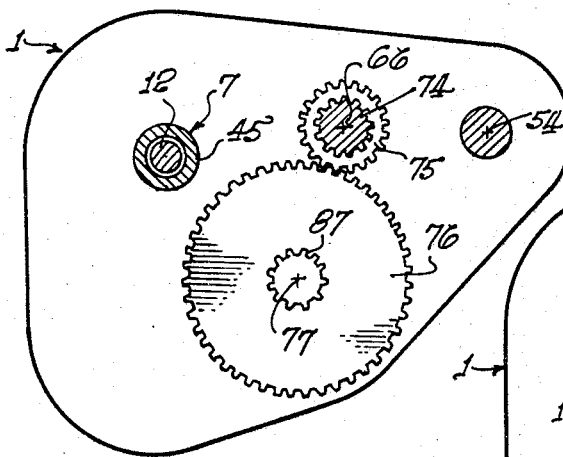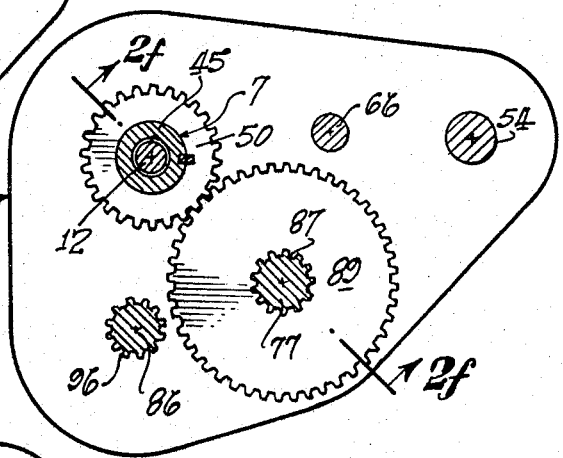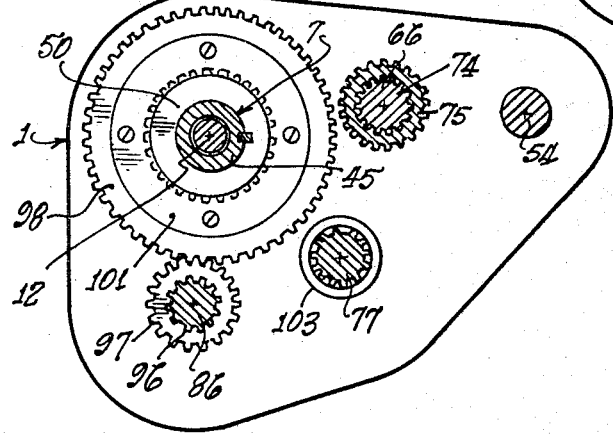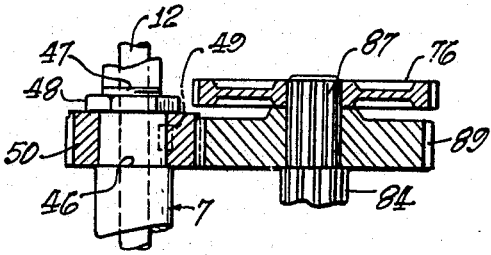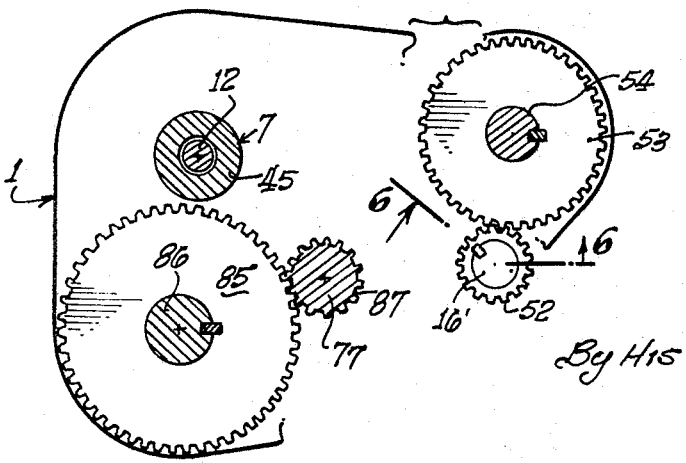

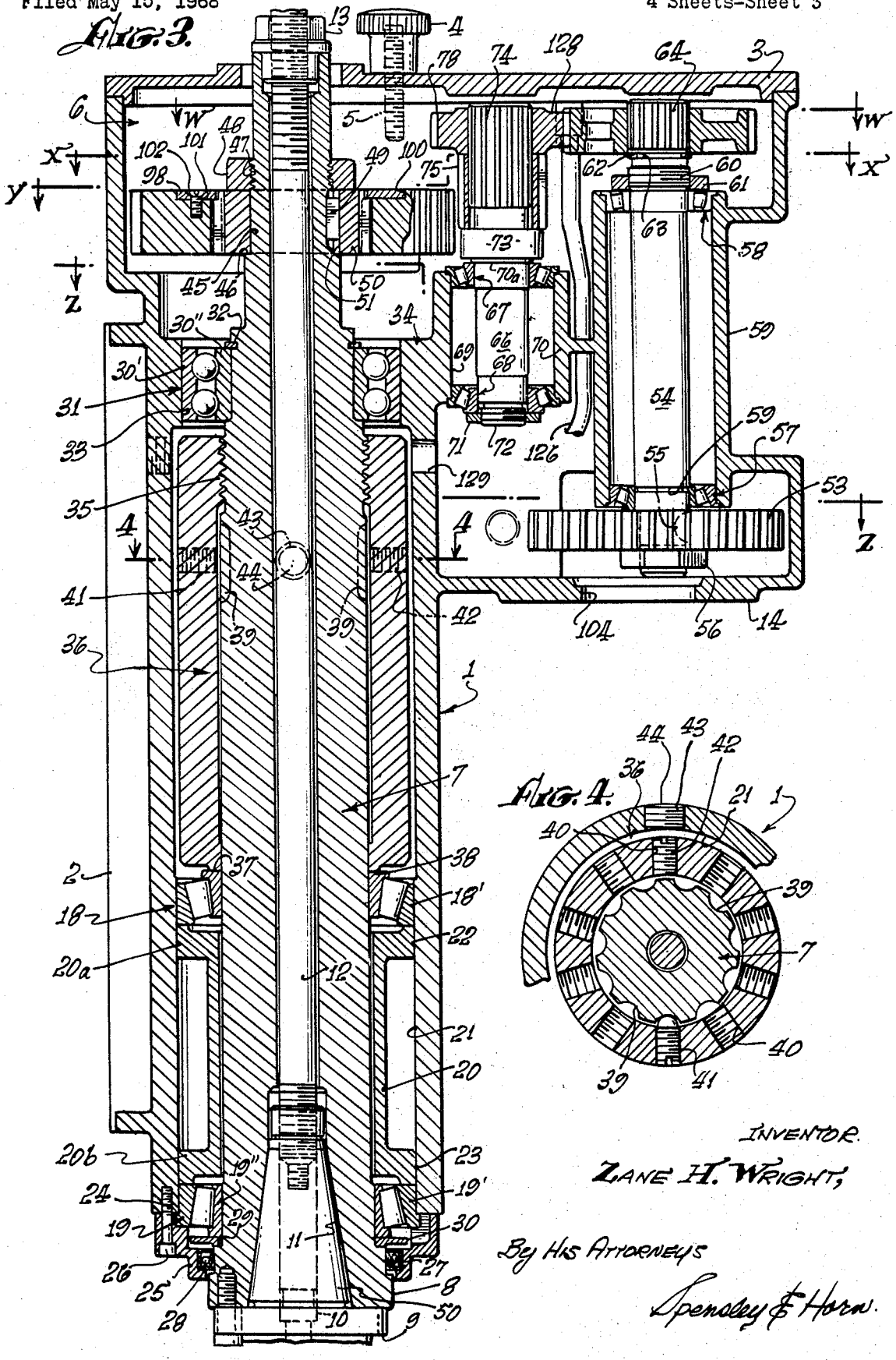

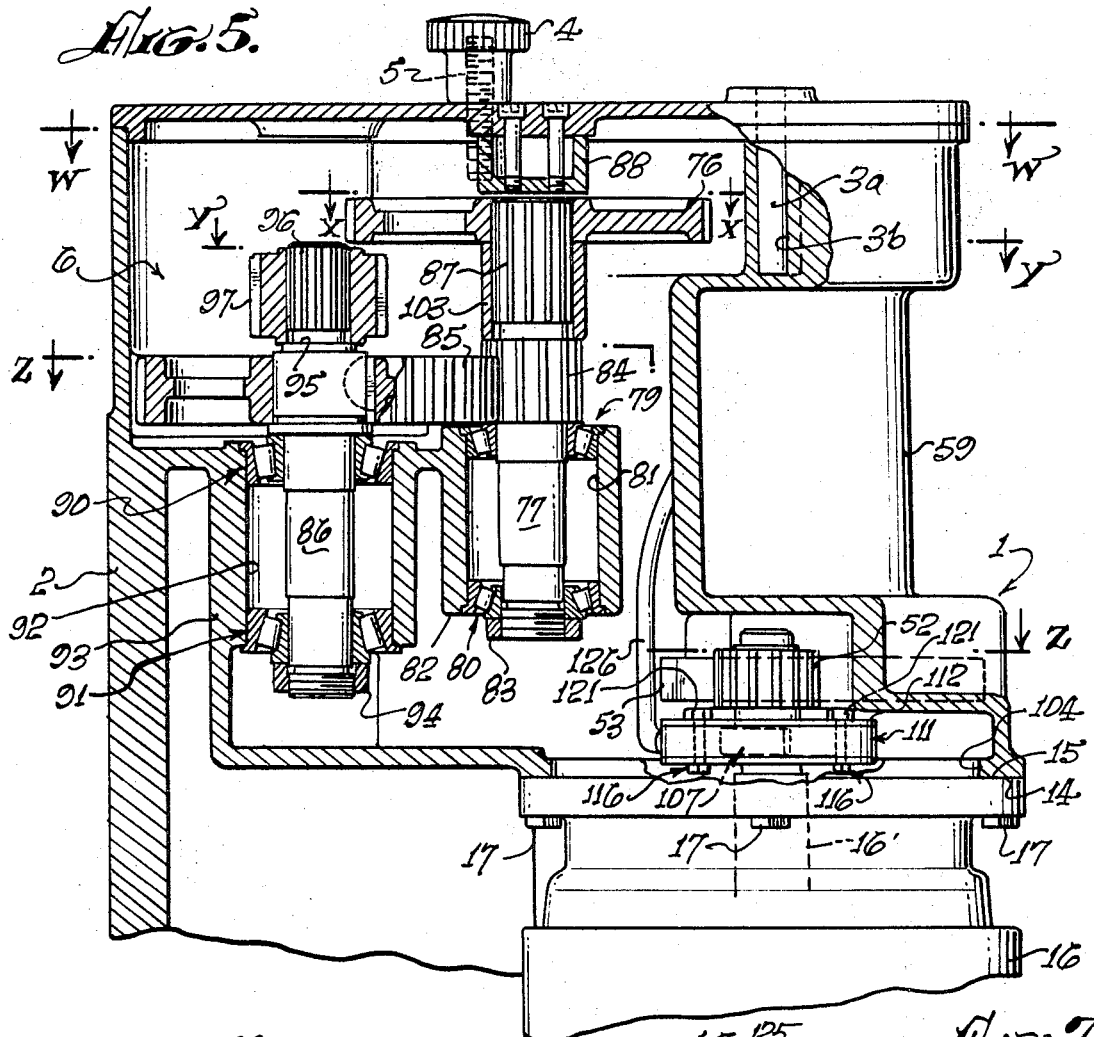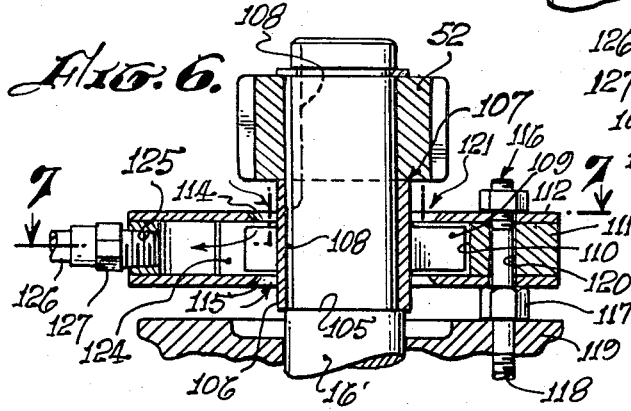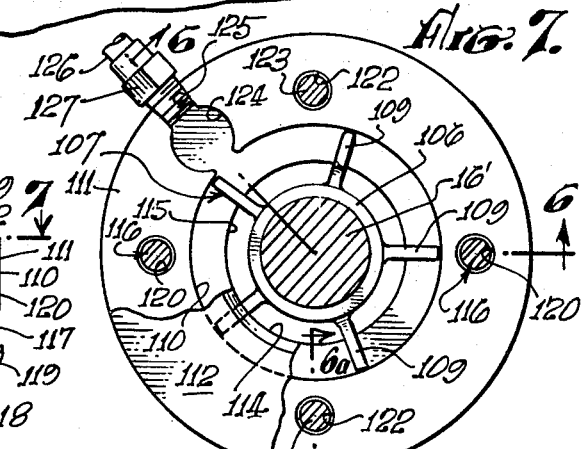

3,524,360
CHANGE SPEED GEARING
FOR MILLING MACHINE
Zane H. Wright, Temple City, Calif., assignor of twenty percent to Sydney Bradpiece, Los Angeles, Calif., and forty percent to Will H. West, Los Angeles, Calif.
Filed May 15, 1968, Ser. No. 729,253
Int. Cl. B23c 1/00; F16h 3/08
U.S. Cl. 74—325          5 Claims

ABSTRACT OF THE DISCLOSURE

A milling machine unit including a frame structure supporting a driving motor and a tool carrying rotatable spindle characterized by the fact that the motor is reversible and is coupled to a spindle to interchangeable gears constituting a transmission means and including an extra countershaft serving, when employed to add an additional speed reduction means, the speed reversal incident to employment of gearing on said extra counter shaft being offset by the reversible characteristic of the motor.

FIELD OF THE INVENTION

The field of the invention is that of milling machines.

SUMMARY OF THE INVENTION

The recent addition to materials for mechanical construction of certain so-called exotic metals such as titanium and alloys thereof, which are extremely hard and tough, has presented a new problem to those engaged in machining such materials. In general, existing machine tools have heretofore been built with a range of spindle speeds suitable for less hard and tough materials and reducing the spindle speed to produce a lower cutting speed suitable for these new materials has involved a reduced speed at the power input of the machine which almost always have a direct motor drive, the result being a reduced power input for an operation which should, if anything, be served by an increased power input.

The expedient of increasing the motor to machine drive shaft ratio is unsatisfactory in that while the machines thus altered is rendered suitable for a hard and tough alloy, its usefulness for those softer metals and alloys such as aluminum and brass which can use very high cutting speeds has been destroyed. The present invention proposes a solution to the problem by the provision of a speed changing means interposable between a driving motor and the tool carrying spindle which while maintaining the high speeds heretofore employed, is capable of a reduced speed for tools cutting titanium, its alloys and various other newly developed hard and tough alloys without any loss in the input power. Milling machine spindles are generally capable of operation in opposite directions of rotation to accommodate right and left hand cutters and the present invention takes advantage of this by an improvement in the power transmission means in which the interposition, where desired, of an extra countershaft means with resultant reversal of spindle rotation is offset by the reversibility of the driving motor.

In the present invention, this optionally interposed gearing is arranged to effect reduction of the spindle speed rather than the alternative of providing an initial lower range for the machine and an increase of the upper range of speed by interposing an extra set of gears. Obviously, the proportionate fractional power loss is reduced by the concept of the present invention. In the invention, regardless of the increased range of speed, full power input of the driving motor is available at all spindle speeds. Other objects and advantages will appear as the description of the presently preferred embodiment of the invention proceeds.

BRIEF DESCRIPTION OF THE DRAWINGS

In the drawings, which illustrate a presently preferred embodiment of the invention described in detail in the specification following:

FIG. 1 is a reduced scale, perspective view of a milling machine unit constituting a presently preferred embodiment of the invention;

FIG. 2 is an enlarged scale, top plan view of the unit shown in FIG. 1 with the top cover removed and with certain parts partially broken away to show details otherwise concealed;

FIGS. 2a through 2e are a top plan semischematic view showing details of the change gear arrangement of the unit and in which figures:

FIG. 2a is a view taken in the horizontal plane of the line W—W of FIGS. 3 and 5;

FIG. 2b is a top plan view taken in the horizontal plane of the line X—X of FIGS. 3 and 5;

FIG. 2c is a top plan view taken in the horizontal plan of the line Y—Y of FIGS. 3 and 5, showing a first arrangement of spindle drive;

FIG. 2d is a top plan view also taken in the horizontal plane of the line Y—Y of FIGS. 3 and 5 but showing a second arrangement of spindle drive; and FIG. 2e is a top plan view taken in the horizontal planes defined by the horizontal portions of the staggered line Z—Z in FIGS. 3 and 5;

FIG. 2f is a fragmentary sectional view taken on the line 2f—2f of FIG. 2d;

FIG. 3 is a sectional view taken on the vertical planes defined by the staggered line 3—3 of FIG. 2;

FIG. 4 is a fragmentary, top plan sectional view taken in the plane of the line 4—4 of FIG. 3;

FIG. 5 is a fragmentary sectional view taken in the vertical planes of the staggered line 5—5 of FIG. 2;

FIG. 6 is an enlarged scale, fragmentary, sectional view of the motor drive shaft and oil pump taken in the plane of the angled line 6—6 of FIGS. 2e and 7;

FIG. 6a is a fragmentary sectional view taken on the line 6a—6a of FIG. 7; and

FIG. 7 is a fragmentary sectional plan view taken generally in the horizontal planes represented by the staggered line 7—7 of FIG. 6.

DETAILED DESCRIPTION OF THE PREFERRED EMBODIMENT

Referring to the drawings, the illustrated embodiment of the invention comprises a self-contained vertical spindle milling unit comprising a frame casting 1 having a vertical mounting pad 2 at one side thereof affording means for mounting the unit on a machine frame in such adjacency to a work holding transporting table that a milling cutter carried by the unit may perform the desired function. Either the portion of the machine frame on which the unit is mounted or the work supporting table or both may be adjustable in horizontal and/or vertical direction. A removable cover 3 is provided with a depending pivot pin 3a which is oscillatable in a cylindrical bore 3b formed in a side wall of the frame and the cover is releasably secured to the top of the frame by one or more threaded hand knobs 4 engaging complementary studs 5 carried by the frame to afford access to the upper portion of the hollow interior of the frame, said upper hollow portion being identified as the change gear cavity 6.

A vertical axis tool or cutter carrying spindle 7 is journaled in bearings in said frame, the lower end 8 of said spindle projecting below the frame and terminating in an end face 9 interrupted by radially extending key means 10 for driving a milling cutter attached to said end and said lower end of said spindle is further provided with an axially disposed tapered socket 11 for reception of the shank of an end mill or like cutter held therein by a draw rod 12 which extends through the spindle and terminates in an operating nut means 13 at the upper end of the spindle which, incidentally, protrudes through an opening in the cover 3.

Forwardly of the space occupied by the spindle bearing portion thereof and about midway of the length thereof the frame is provided with a downwardly facing flange portion 14 to which the complementary upwardly facing flange 15 of the frame of a vertical shaft electric motor 16 is attached by bolts 17, the driving shaft of the motor projecting into the opening in the frame structure 1 defined by the inner perimeter of the flange 14.

The spindle 7 is journaled in the housing of frame 1 by a main or head bearing means including opposed taper roller bearing assemblies 18 and 19 which are maintained in spaced relation by an interposed sleeve 20 having peripheral flange ends 20a and 20b at the opposite ends thereof which terminate in end faces 22 and 23 which, respectively, engage the adjacent end faces of the outer faces 18' and 19' of the bearing assemblies 18 and 19. The bearing assembly 19 is disposed at the lower end of the bore 21 and the outer race 19' thereof includes a shoulder 24 engaging the lower end face of the housing of frame 1 and a retainer ring 25 secured to the lower end of the housing by screws 26 engages the outer or lower end of said outer race. The retainer ring also is provided with a groove 27 housing an oil seal 28 which engages the adjacent surface of the spindle.

The lower end of the spindle 7 is provided an annular shoulder 29 which supports a washer 30 and the opposite face of said washer is engaged by the outer or lower end face of the inner race 19'' of the bearing assembly 19. The apices of the tapers of said bearing assemblies extend toward each other, wherefore, end thrust exerted on the inner race of bearing assembly 18 will be communicated through the rollers thereof to the outer race and thence through sleeve 20 to the outer race of bearing assembly 19 which is anchored against the frame structure by the retainer ring 25 and screws 26.

In machine tools, the head or main bearing of the spindle must have free rotation with the least possible end and radial play and opposed taper roller bearings afford one way in which this may be achieved. This clearance must be adjustable within very close limits and the adjusting means must be such as to be incapable of accidental loosening. Moreover, those spindles which may rotate at high speeds must have good running balance, wherefore, the adjusting means must be such as will achieve that adjustment without creating unbalance in the spindle.

The upper or rear end of the spindle 7 is journaled in a radial thrust ball bearing assembly 31 of which the inner race 30'' is secured adjacent to a shoulder on the spindle by a snap ring 32 with the outer race 30' thereof being closely but slidably received in a bore 33 which is slightly smaller than and also is concentric with the bore 21, said bore 33 extending through a cross wall portion 34 in the frame structure 1 between the bore 21 and the change gear cavity portion 6 of the hollow interior of the frame structure. Adjacent to the upper end of the bore 21, the spindle is provided with a threaded portion 35 which is engaged by the internally threaded end of an adjusting sleeve 36 which surrounds the spindle and thence extends downwardly in concentric spaced relation to the exterior of the spindle to a bearing face 37 closely engaging the surface of the spindle and said sleeve terminates in an end face portion 38 which engages the adjacent end of the inner race 18' of the bearing assembly 18. Obviously, relative rotation of the sleeve and spindle will effect relative axial displacement thereof and thus vary both the end and radial running clearance of the spindle, the slip fit of the outer race of the bearing assembly 30 in the bore 33 permitting such adjustment by self-accommodation.

Immediately adjacent to and below the threaded portion 35 thereof, the spindle is provided with a plurality of equally circumferentially spaced, longitudinally extending grooves 39, the number of such grooves preferably being an odd number for a reason which will presently appear and the length of the grooves being at least as great as the range of axial adjustment desired for the bearing assemblies 18 and 19. The sleeve 36 is provided with a plurality of equally circumferentially spaced, radially extending threaded holes 40 disposed preferably in the same transverse plane as the groove 39 and preferably being an even number either one more or one less than the number of grooves 39. A rounded end set screw 41 is disposed in one of the holes 40 with the rounded end thereof engaging one of the grooves 39 and a flat ended set screw 42 is disposed in the diametrically opposite one of the holes 40, and since the spindle is provided with an odd number of the grooves 39, that set screw will engage the spindle surface between two adjacent grooves. The length of these two set screws is such as to terminate substantially flush with the outer surface of the sleeve 36 when engaging the respective portions of the spindle for which they are intended.

Having reference to FIG. 4 and assuming that it is desired to reduce the bearing clearance by screwing the sleeve 36 downwardly on the spindle, the screw 42 is first loosened from engagement with the spindle through an access bore 43 in the frame which is normally closed by a screw 44. The spindle is then rotated to bring the screw 41 into registry with the bore 43 and the screw 41 is removed and inserted in next hole 40 in a counterclockwise direction and is tightened. In the illustrated embodiment, there are eleven of the grooves 39 and ten of the bores 40. This change in position of the screw 41 will effect the rotation of the sleeve clockwise $\frac{1}{110}$ of a revolution and if, for example, the threads interconnecting the sleeve and spindle were 12 threads per inch, this adjustment would achieve an endwise adjustment of .000757'' with absolute certainty that the adjustment would be retained. The spindle assembly would then be rotated substantially a half revolution to bring the screw 42 into alignment with the bore 43 and that screw would be removed and replaced in one of the said holes 40 which is diametrically opposite the screw 41 in its new location.

At slower spindle speeds, this provision is not important but in those cases in which spindle speeds of 2,000–3,000 r.p.m. are employed, the presence of only one of screws 41 with a void diametrically opposite thereto would create an unbalanced condition which could make close tolerance machining impossible. The use of the diametrically opposite screw 42 overcomes that and thus by having the even numbered component as the screw carrying member, this balance can be maintained at any speed. Obviously, the extent and direction of relative rotation of the sleeve and spindle can be in either direction and in the desired amount of endwise adjustment effected in extremely small increments as could be determined by the pitch of the threads and the number of grooves in the spindle and the screw receiving holes in the adjusting sleeve. When adjustment is completed, the access bore 43 is closed by the screw 44. Obviously, also, this bearing adjustment is not only one which is made in predetermined increments but is also one which is positively locked against displacement by shock.

Within the change gear cavity 6, the spindle is provided with a gear mounting hub 45 extending between a shoulder 46 and a threaded portion 47. A nut 48 on said threaded portion and a key 49 in the surface of said hub serves to mount a gear 50 thereon, said gear having a keyway 51 engaged by the key 49. The various manners in which this or other gears may be interconnected with the motor for driving the spindle at any one of a large number of speeds and in a desired direction of rotation will be described incident to tracing the transmission of power from the motor 16 to the spindle.

The motor shaft 16' projects into the opening in the frame structure 1 defined by the flange surface 14 and the end wall of the motor frame combines with the adjacent portion of the frame structure to define an oil sump for the lubricating means presently to be described. At its upper or distal end, the motor shaft carries a driving pinion 52 which meshes with a driving gear 53 fixed to the lower end of a vertical countershaft 54 by a driving key 55 and a nut 56. The countershaft 54 is journaled in opposed taper roller bearings 57 and 58 at the upper and lower ends of the sleeve portion 59 formed integrally with the frame structure casting and the upper end of the counter shaft 54 projects therefrom into the change gear cavity portion 6 of the frame structure.

The nut 56 and gear 53 serve to secure the inner race of the bearing 57 against a shoulder 59 on the shaft 54 and beyond the bearing 58, the shaft is threaded as at 60 and carries a nut 61 which by engagement with the inner race of the bearing 58 adjusts the end play of the shaft 54. Beyond the threaded portion 60, the shaft is provided with an annular stop flange formed by a snap ring 62 seated in a groove 63 and a splined end 64 on which various sizes of change gears may be readily mounted and dismounted as, for example the gear 65 engaging the said stop flange shown in FIGS. 2, 2a and 3.

Disposed adjacent to and in parallelism with the shaft 54 is a first countershaft 66 having its lower end mounted in a pair of spaced, opposed, taper roller bearing assemblies 67 and 68 mounted, respectively, at the upper and lower ends of a bore 69 extending through a boss 70 which is formed as an integral part of the frame structure 1. As here shown, the upper end of the inner race of the upper bearing assembly engages a shoulder 70a on the shaft and the ledge on the outer race of the bearing assembly engages the upper face of the boss 70. The outer race of the lower bearing assembly 68 is provided with a ledge on the lower end of the boss 70 while the lower end of the inner race of said lower bearing assembly engages a nut 71 carried by the threaded lower end 72 of the shaft 66.

The upper end of the countershaft 66 above the bearing means described includes an integral collar portion 73 and a splined end portion 74 sufficiently long to receive a first gear 75 adapted to mesh with a gear 76 on a second countershaft 77 (see FIG. 2b) and a second gear 78 at the outer end of the splined portion 74 which is thus positioned to mesh with the gear 65 (see FIG. 2a). At this point it should be mentioned that the gears designated as 65 and 78 may be of different sizes so long as they mesh together. For example, gears might be provided having 27, 29, 33 and 35 teeth wherefore the gears having 27 and 35 teeth can be used together and the gears having 29 and 33 teeth can be used together and since the splined portions 74 and 64 are identical, the gears can be interchanged with the result that four different speed ratios between the shafts 54 and 66 can be achieved by the selective use of these four gears. Dependent on the needs of a particular installation of the invention, it may be proper to point out that any number of pairs of gears of varying ratios may be provided.

The countershaft 77 is parallel to the shaft 66 and the lower end thereof is journaled in upper and lower taper bearing assemblies 79 and 80 mounted in opposite ends of the bore 81 extending through a boss 82 formed integrally with the frame structure 1 and a nut 83 on the threaded lower end of the shaft 77 holds the shaft and bearing assemblies in operative interengagement in the same manner as is provided for the corresponding end of the shaft 66. Above and adjacent to the bearing assembly 79, the shaft 77 is provided with an integrally formed pinion 84 which is in constant mesh with a gear 85 carried by a third countershaft 86 to which reference will presently be made. Above the pinion 84, the distal end 87 of the shaft is splined for a length sufficient to hold either two gears on the said splined end or a single gear separated from the gear 84 by a spacer as will be presently described. The upper end of the shaft terminates at a level so that the uppermost gear thereon (which is in mesh with the pinion 75) affords clearance for the gear 78 above it (see FIGS. 2 and 2b). The cover is provided with slight bosses overlying the upper ends of the shafts 54 and 66 to keep the gears mounted on the splined ends of those shafts from coming off and the cover is further provided with an extension 88 similarly overlying the upper end of the shaft 77.

Between the gear 76 and the pinion 84 the splined end 87 carries a gear 89 which meshes with the gear 50 on the spindle (see FIG. 2d) and thus there are two additional ratios possible, viz, changes in the size of the gears 75 and 76 and between the gears 89 and 50. There being, by way of example, four ratios established between the shaft 54 and 66, the mere transposing of the gears 75 and 76 and, in effect, transposing the gears 89 and 50 would produce a total of 16 possible speeds. Under these considerations it is recognized that the gear 50 is not thus transposable and that in any such interchange there would have to be a separate gear to replace the gear 50 due to the different form of engagement with the spindle as compared to the splined end of the shaft 77.

The countershaft 86 is mounted in a manner similar to the shafts 66 and 77 comprising a pair of opposed, upper and lower taper roller bearing assemblies 90 and 91 mounted at the opposite ends of a bore 92 in a boss 93 projecting from an interior wall of the frame structure 1, said shaft and bearing assemblies being secured in assembly with suitable operating clearance by a nut 94 on the threaded lower end of the shaft 86 engaging the inner race of the lower bearing assembly 91. The gear 85 is keyed to the shaft adjacent to the bearing assembly 90 (see FIGS. 2, 2e, and 5) and above the gear 86, the shaft is provided with a stop flange 95 and a splined distal end 96 on which may be mounted a gear 97 for meshing with a gear 98 which is mounted on the spindle gear 50 (see FIGS. 2 and 2c). To this end, the gear 98 is provided with internal gear teeth which are complementary to the gear teeth of the gear 50 so that the gear 50 serves as a mounting spline for the gear 98. Since the gear 98 is to drive the spindle at slower speeds and at greater loads, the gear face is made somewhat wider and the pitch of the teeth is decreased to give stronger teeth. To position the gear 98 at the level for engagement with the gear 97, the upper face of the gear 98 is provided with a circular recess 100 in which a flat metal ring 101 is secured by screws 102 with the inner portion of said ring overhanging the spaces between the teeth of the internal gear configuration and thus overlying the teeth of the gear 50 to support the gear 98.

Not only because of the fact of introduction of the gear 98 makes the use of the gear 89 impossible but also due to the fact that another countershaft has been introduced in the train of gearing, the gear 89 must be omitted. This is achieved by removing the gear 89 and substituting a sleeve 103 therefor (see FIG. 5) which maintains the gear 76 at the level of the pinion 75 with which it is in mesh. The effect of the compound reduction achieved by the introduction of the countershaft and its gearing into the train results in a series of further reduced spindle speeds which are suitable for cutting very hard and tough metallic materials. The introduction of the extra countershaft has, in effect, reversed the direction of spindle rotation but this may be corrected by reversing the direction of rotation of the driving motor dependent on the direction of rotation required by the milling cutter employed. As is usual, in machine tools having a range of spindle speeds, a suitable data plate showing the gears to be employed on the various shafts to achieve desired rates of spindle rotation may be mounted on each frame structure.

There remains for consideration, the lubrication means for the gearing above described. The fact that the end of the motor frame carrying the flange surface 15 cooperates with the portion of the frame structure 1 carrying the flange 14 to seal the opening 104 surrounded by or defined by the flange 14 and thus forms an oil sump in the frame structure which has already been referred to. Mounted on the motor shaft 16′ between the lower side of the gear 52 and the shoulder 105 on the motor shaft is the hub 106 of the pump impeller 107, said impeller being secured to the shaft for rotation therewith by the key 108 which also secures the gear 52 to the shaft. The impeller includes a plurality of radial vanes 109 confined within, but spaced from the wall surfaces of a circular cavity 110 in a housing comprising a main frame member 111 and upper and lower side plates 112 and 113. The side plates 112 and 113 are circular in plan and have central openings 114 and 115 which slightly overlie the inner periphery of the pump frame member 111 as best shown in FIG. 6. The pump frame assembly, comprising the member 111 and plates 112 and 113, is mounted on the end of the motor frame by two studs 116, 116 threaded at both ends and having a hexagon, wrench engaging intermediate portion 117. One end 118 of the two studs serves as a replacement for two of the screws which serve to hold the motor bearing retainer 119 secured to the motor frame, the portion 117 serving as the screw head. The opposite ends of the studs 116 extend through diametrically opposite bores 120, 120 extending through the pump frame parallel to the axis of the motor shaft and at the upper side of the frame are threaded to engage hold down nuts 121, 121 which clamp the pump assembly together and position it on the outer ends of the portions 117, 117. Thus, the frame is mounted on the motor in spaced relation to the motor frame and in a proper spaced relation relative to the impeller 107.

The hub frame is also provided with two threaded bores 122, 122 extending therethrough and disposed in a diametral line normal to a diametral line including the studs 116, 116. Mounted in each of these threaded bores is a set screw 123 having a nut 123a at the upper surface thereof and a nut 123b at the outer surface thereof serving to clamp the plates 112 and 113 against the body member 111 and the vertical adjustment of the set screw 123 abutting against the end of the motor frame structure serves to level the frame. At one point in its periphery the hub frame is provided with a discharge receiving cavity 124 connected to a threaded outlet port 125. A discharge conduit 126 is connected to the port 125 by a fitting 127 and thence extends upwardly along a portion of the frame housing the shaft 54 to a terminal nozzle end 128 which is provided with a series of small openings in the side wall thereof at the level of engagement between the gears 65 and 78 so that oil discharged by the pump is delivered to these rapidly moving gears and is dispersed thereby throughout the cavity of the housing means. Some of the oil thus distributed will, of course, pass through the bearing means 31 at the upper end of the spindle and will fill up all spaces within the spindle and its bearings, an overflow port 129 being provided to allow excess oil to be returned to the sump.

In use, the sump is filled to a level in which the pump body is completely submerged. Upon starting the motor, oil will be drawn in through the inlet ports 114 and 115 and will be discharged through the conduit means 126 and sprayed over the entire gear train. Due to the fact that the impeller vanes 109 are radial, the pump will be equally efficient regardless of the direction of rotation of the motor. Moreover, since the pump is associated directly with the motor shaft, the supply of lubricant will be constant regardless of the speed of operation of the cutter associated with the unit. Still further, the design of the pump is such that it can be incorporated with a standard motor without any alteration of the motor except the substitution of the two studs 116, 116 for certain screws associated with the motor frame structure. It should be noted at this point that the motor, oil pump and discharge pipe or tube are removable and replaceable as a unit and that removal of this unit affords access for assembly and adjustment of the bearings for the various countershafts.

Thus, there has been created a milling machine device including a cutter supporting spindle, a driving motor and an intermediate gear train in which a wide range of spindle and cutter speeds is achieved by a very simple set of change gears and in which an extremely low range of speeds is achieved by interposing, when required, an additional gear reduction means and in which the gear normally employed to drive the spindle serves as a mounting means for another gear such as employed when the device is used with extremely low cutting speeds. Another feature is the novel means for effecting operating clearance adjustment for the spindle which provides positive increments of adjustment while preserving the dynamic balance of the spindle which, incidentally, is not limited in utility to vertically disposed milling machine spindles but can be applied to any spindle or shaft in which a close bearing adjustment is desirable. Still another feature of the invention is the utilization of the opening to which the driving motor is attached and the novel construction of the countershaft mounting means of the device including adjusting nuts which are accessible through the opening provided by removing the motor from the device. In this connection, it is particularly to be noted that except for the emergence of the opposite ends of the spindle, every rotating part of the device is completely contained within the frame structure. Further, the device features a novel lubricating means embodying a pump device which is operative regardless of the direction of rotation of the driving motor for the apparatus and which utilizes the diffusing effects of rapidly rotating gears for distributing the oil throughout the interior of the housing.

While the foregoing specification has disclosed a presently preferred embodiment of the invention, it will be understood that the invention is not to be deemed to be limited to the precise details of construction thus disclosed by way of example and that the invention includes as well all such changes and modifications in the parts, and in the construction, combination and arrangement of parts.

I claim:

1. In a milling machine apparatus, a hollow enclosed frame structure affording bearing support for a tool carrying spindle, a reversible driving motor mounted on said frame structure and having a drive shaft projecting into the interior of said frame structure, gear train means interconnecting said driving shaft and said spindle for tion of rotation of said motor and interchangeable gear means operative to extend said gear train to drive said spindle in a direction opposite to that of said motor and at a speed lower than that otbainable by the unextended gear train means.

2. A milling machine apparatus as claimed in claim 1 in which said gear train extending means includes a countershaft which is not employed when said spindle is driven in the same direction as said motor.

3. A milling machine apparatus as claimed in claim 2 in which said spindle carries a gear which is normally in mesh with and is driven by another gear of said gear train means when said spindle is being rotated in the same direction as said motor, and in which said gear on said spindle serves as a mounting means for a larger gear positioned to be engaged by a driving gear carried by said countershaft when said gear train means is extended.

4. A milling machine apparatus as claimed in claim 1 in which said frame structure has an open top surface closed by a removable cover, in which said gear train means includes a plurality of vertical shafts having splined ends, in which at least some of said change gears are interchangeable on said splined ends of said shafts, and in which said cover serves as a retainer to hold the change gears on said shaft ends.

5. A milling machine apparatus as claimed in claim 1 in which said frame structure includes a downward facing flange surface surrounding an opening, in which said motor is a vertical shaft motor having a frame structure attached to said flange with resultant closure of said opening, and in which said gear train means is so disposed in said frame structure that said opening, when said motor is removed, acords access for assembly and adjusting said gear train means.

References Cited

UNITED STATES PATENTS

| | | | |
|---|---|---|---|
| 2,025,902 | 12/1935 | Roehm | 90—20 |
| 2,612,786 | 10/1952 | Schmitter | 74—325 |
| 3,015,966 | 1/1962 | Howard | 74—325 |
| 3,148,556 | 9/1964 | Gibbs et al. | 74—325 |
| 3,209,619 | 10/1965 | Howard et al. | 74—705 |

LEONARD H. GERIN, Primary Examiner

U.S. Cl. X.R.

90—11

UNITED STATES PATENT OFFICE
CERTIFICATE OF CORRECTION

Patent No. 3,524,360   Dated August 18, 1970

Inventor(s) Zane H. Wright

It is certified that error appears in the above-identified patent and that said Letters Patent are hereby corrected as shown below:

Column 8, line 56, "tion" should read -- rotation of said spindle in the same direction as the direction --.
Column 9, line 13, "acords" should read -- affords --.

Signed and sealed this 13th day of April 1971.

(SEAL)
Attest:

EDWARD M. FLETCHER, JR.
Attesting Officer

WILLIAM E. SCHUYLER, JR.
Commissioner of Patents